No. 865,566. PATENTED SEPT. 10, 1907.
J. CARPENTER.
WEEDER, CHOPPER, AND SCUFFLE HOE.
APPLICATION FILED APR. 9, 1907.
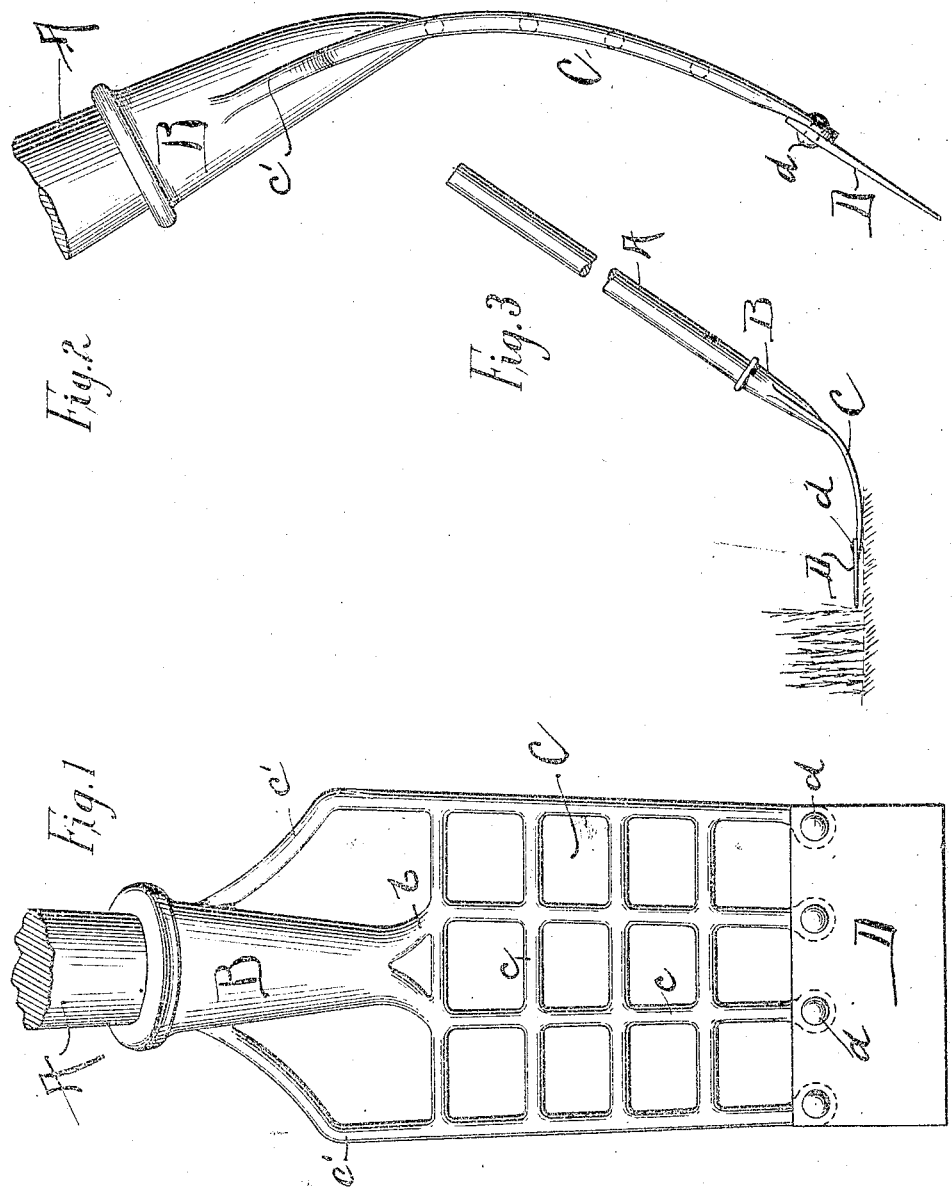
Attest:
F. C. Alexander
J. Alexander Vernon
James Carpenter Inventor,
by his Att'ys
Hensey & Gough

UNITED STATES PATENT OFFICE.

JAMES CARPENTER, OF BROOKLYN, NEW YORK.

WEEDER, CHOPPER, AND SCUFFLE-HOE.

No. 865,566.  Specification of Letters Patent.  Patented Sept. 10, 1907.

Application filed April 9, 1907. Serial No. 367,194.

*To all whom it may concern.*

Be it known that I, JAMES CARPENTER, a citizen of the United States, residing at Brooklyn, in the county of Kings, State of New York, have invented certain new and useful Improvements in Weeders, Choppers, and Scuffle-Hoes, of which the following is a specification.

My invention relates to agricultural implements and particularly to an implement devised for weeding and otherwise working around the roots and beneath the leaves of plants.

The invention consists in an implement having a gridlike body portion set at an angle to the shank thereof, and a blade attached to the end of said gridlike portion.

The object of the invention is to provide an implement which shall have a blade capable of being worked horizontally beneath the leaves of plants, along the ground, or through loose earth forming a plant bed; which shall be capable of cutting out the weeds therein, of breaking up clods of earth and of extracting therefrom small stones and other foreign substances.

My device is shown in the accompanying drawings wherein,

Figure 1 is a face view of the implement, Fig. 2 is a side view, and Fig. 3 a general side view showing its use and operation.

Like letters in the views indicate like parts.

B designates a tubular shank or socket adapted to receive the lower end of a handle A such as is ordinarily used for hoes or other implements of like character. Attached to the lower end of the socket B is a body C composed of rectangularly crossing bars c forming a grid. Preferably these bars c and the socket B are cast all in one piece, the bars being slightly rounded. As I have shown this construction, the grid C is held firmly to the socket B by the two lateral extensions c' of the grid and by the bifurcated lower end b of the socket B.

The grid C is arranged at an obtuse angle to the socket B in order that when the handle of the implement is held at the ordinary inclination the grid will lie approximately upon or parallel with the surface of the ground.

At their extremities the longitudinal bars c of the grid are flattened and formed into eyes to receive rivets d for the attachment of the blade D. This blade is very much like the ordinary hoe blade as far as sharpness is concerned and forms a cutting edge to the grid C.

The body of the implement is turned at such an angle to the axis of the socket B that the body of the implement will rest approximately flat upon the ground when the handle is held at the normal operating inclination. Of course, it is to be understood that the implement need not be held at this angle as the angle would vary depending upon the work to be done. Preferably, too, the body is slightly curved from the lower end of the socket B to the end of the blade. I have shown this curve in Fig. 2 slightly exaggerated for purposes of illustration.

While I have shown what I deem to be the best construction of my implement, I do not wish to be limited thereto as the essential features of the invention may be embodied in a number of ways.

The use and operation of my device are as follows: With the ordinary hoe it is practically impossible to work under very low plants or shrubbery without injuring the lower leaves thereof and without the hoe blade obstructing the view of the work to be done. My device, however, is capable of insertions beneath the lower leaves of plants and the ground may be worked and weeded right up to the very stalk of the plant itself, the blade D acting to slice off and cut out those weeds or roots which it is desirable to eliminate. By inclining the handle at various angles, a large number of different effects may be gotten, while at the same time by turning the handle completely over so that the blade is held in the reverse position to that shown in Fig. 3, the blade will practically form a hoe. The action of the grid C is to break up and disintegrate clods of earth, to level the ground and crumble the soil. It is to be understood, of course, that the body and blade need not be worked entirely upon the surface of the ground but that they are also to be worked slightly beneath the soil for the purpose of breaking it up or cutting out the very roots of the weeds. Working it in this way, there is another advantage derived from the grid in that stones, bits of wood, and other extraneous objects are caught upon the top of the grid as they might be upon a sieve. The small broken particles of earth drop through the spaces between the bars c and the foreign objects may be thus easily eliminated. This is a result not achieved by any other implements of which I know. Where the implement is held with its handle at a slightly more acute angle than the angle shown in Fig. 3, the earth may be easily pushed into place by the grid and that is one of the reasons for slightly curving the body of the tool from the end of the grid to its base. Where it is curved like this the cross bars of the grid each engage a portion of the earth to force it forward to draw it back and break it up. It will thus be seen that not only does the tool operate to eliminate weeds but it breaks up the soil about the plant and extracts small stones. It also works beneath the surface of the soil as readily as it does above. As the tool goes over the ground in addition to breaking up and disintegrating the earth, the grid also acts to pull out the weeds with which it becomes slightly entangled. The implement may also be used as a chopper and edger by holding it practically in position shown in Fig. 2. The blade D as it is narrow and supported along its entire length by its attachment to the grid does not require to be made of heavy material and may be so thin as to keep its edge and require no sharpening.

Having described my invention what I claim is:

1. An agricultural implement comprising a transversely flat grid portion formed of longitudinal and transverse bars, all of the transverse bars being on the same plane, a cutting blade carried at the forward end of the longitudinal bars, and a socket extending upward directly from the rear end of the grid portion and at an obtuse angle thereto.

2. An agricultural implement comprising a grid portion formed of longitudinal and transverse bars, the whole of said grid portion being slightly curved from front to rear and transversely flat, a blade attached to the forward ends of the longitudinal bars of the grid, and a handle socket at the rear end of the grid portion projecting upward at an obtuse angle thereto.

3. An agricultural implement comprising a socket adapted to receive a handle, a grid at the end thereof composed of longitudinal and transverse bars, the longitudinal bars having eyes at the ends thereof, and a blade riveted to said bars through said eyes.

4. An agricultural implement comprising a socket adapted to receive a handle, a grid set at an obtuse angle to said socket and composed of longitudinal and transverse bars, said grid being slightly curved from front to rear but on the same plane transversely, and a blade attached to the ends of said longitudinal bars.

5. An agricultural implement comprising a socket adapted to receive a handle, a grid portion cast in one piece with the handle but extending from the lower end thereof at an obtuse angle, said grid being composed of longitudinal and transverse bars, the lower ends of the longitudinal bars being formed with eyes, and a blade riveted to said eyes.

6. An agricultural implement comprising a comminuting body adapted to rest upon the surface of the ground and having longitudinal and transverse bars, a cutting blade attached to the front ends of the longitudinal bars, and a handle socket extending upward from the rear end of the body at an obtuse angle thereto, said body portion being transversely flat across its entire width.

In testimony whereof, I have signed my name to this specification in the presence of two subscribing witnesses, this 5th day of April 1907.

JAMES CARPENTER.

Witnesses:
 FREDERIC B. WRIGHT,
 J. ALEXANDER VERNON.